United States Patent [19]

Arnold

[11] 4,151,413

[45] Apr. 24, 1979

[54] METHOD OF MEASURING HORIZONTAL FLUID FLOW BEHIND CASING IN SUBSURFACE FORMATIONS WITH SEQUENTIAL LOGGING FOR INTERFERING ISOTOPE COMPENSATION AND INCREASED MEASUREMENT ACCURACY

[75] Inventor: Dan M. Arnold, Houston, Tex.

[73] Assignee: Texaco Inc., White Plains, N.Y.

[21] Appl. No.: 811,023

[22] Filed: Jun. 29, 1977

[51] Int. Cl.[2] .......... G01V 5/00

[52] U.S. Cl. .......... 250/270

[58] Field of Search .......... 250/264, 265, 266, 269, 250/270

[56] References Cited

U.S. PATENT DOCUMENTS

| | | | |
|---|---|---|---|
| 3,304,424 | 2/1967 | Mills, Jr. | 250/270 |
| 3,603,795 | 9/1971 | Allaud | 250/270 X |
| 3,864,569 | 2/1975 | Tittman | 250/269 X |

*Primary Examiner*—Davis L. Willis

*Attorney, Agent, or Firm*—Carl G. Ries; Thomas H. Whaley; William J. Beard

[57] ABSTRACT

Fluid in permeable earth formations adjacent well casing is irradiated with neutrons to form radioactive tracer isotopes in the chemical elements comprising the fluid, typically sodium 24 in saline subsurface formation water, and in other elements in the casing and formation each of which decays by emission of gamma rays. By measuring the rate of decay of the radioactive tracer isotope, a measure of horizontal fluid flow in the formation is obtained. The elements in the casing and formation have been found to also respond to the neutron irradiation by forming radioactive isotopes, such as calcium 49 in the formation and manganese 56 in the steel casing, which emit gamma rays which interfere with the gamma radiation measurements of the trace element indicative of water flow. A method of measuring horizontal fluid flow while compensating for the presence of gamma rays from elements in the casing and formation and also increasing the accuracy of the measured linear fluid flow velocity is disclosed.

16 Claims, 5 Drawing Figures

METHOD OF MEASURING HORIZONTAL FLUID FLOW BEHIND CASING IN SUBSURFACE FORMATIONS WITH SEQUENTIAL LOGGING FOR INTERFERING ISOTOPE COMPENSATION AND INCREASED MEASUREMENT ACCURACY

CROSS-REFERENCE TO RELATED APPLICATIONS

The present application is directed to radioactive logging of wells to measure horizontal fluid flow in formations, as are co-pending U.S. Patent Applications Ser. No. 698,394, filed June 21, 1976 now U.S. Pat. No. 4,051,368, and Ser. No. 808,422, filed June 20, 1977, each of which is assigned to the assignee of the present application.

BACKGROUND OF INVENTION

1. FIELD OF INVENTION:

The present invention relates to radioactive well logging techniques to measure the lateral flow of fluid in subsurface earth formations.

2. DESCRIPTION OF PRIOR ART:

In secondary and tertiary recovery of petroleum deposits many of the recovery techniques employ the injection of water or chemical solutions into the earth formations comprising the reservoir. In planning the recovery operation, the injection of water or chemical has in the past been limited by certain assumptions and/or approximations concerning the mobility of fluids in the formation comprising the reservoir. A crucial factor in such fluid injection programs is the vertical conformity of the producing formation as well as its horizontal permeability and uniformity. In some reservoirs, formation lensing or horizontal partitioning by permeability barriers such as faults can occur. In such instances, apparently correlevant intervals of permeability may be separated from one well to another in the field by such formation lensing or permeability barriers being interposed across the interval of formation between the wells.

It is therefore apparent that large amounts of costly chemicals or water could be injected before it is established that continuity between injection and producing wells is partially or totally absent. If, on the other hand, continuity does exist, it is known that the water in the vicinity of the producing well begins to flow laterally soon after injection is initiated and long before the injected fluid actually arrives at the producing well. The detection of lateral water flow is, therefore, indicative of formation continuity. The speed of the flow, when combined with injection rates, formation thickness, formation porosity, and well spacings, can be used to determine the degree of continuity. This early definition of formation continuity could prevent the expenditure of large sums of money, time and effort in a fruitless project to recover secondary or tertiary problem deposits.

A second application of the detection of lateral water-flow is the mapping of the total flow throughout a petroleum reservoir to help in the operational planning of injecting chemicals or water and to assist in determining optimum withdrawal rates. Moreover, a knowledge of the lateral water flow characteristics of a particular formation in a producing field can help greatly in general understanding of the reservoir dynamics of the particular reservoir being produced.

It is sometime desirable in a reservoir with multiple producing intervals for a reservoir engineer to be able to delineate those producing zones which provide the most water influx or water drive to the production of petroleum. The mapping of lateral water movement in all zones both above and below the expected water table in the producing formation should supply this information to the reservoir engineer.

In the past, reservoir engineers have been provided with relatively few and often inaccurate well logging instrumentation in order to determine the vertical conformance characteristics of the earth formations comprising a reservoir. This has led to resultant confusion as to the properties of the earth formations comprising a reservoir. Radioactive tracer studies of the movement of fluids in the vicinity of a well borehole can be misleading in this respect because of the lack of uniform absorption of the tracer element into the flowing stream of formation water. Also, it is difficult to provide tracer isotopes with sufficient half life to be injected at an injection well and observe their movement days or even weeks later at a monitoring or producing well, in order to obtain some idea of the lateral flow speed or velocity of fluids in the formation comprising the reservoir.

In co-pending application Ser. No. 698,394, now U.S. Pat. No. 4,051,368 referenced above, liquids in the formation adjacent the well were bombarded with high energy neutrons. Where the fluid was at least partially saline, as in salt water, radioactive $Na^{24}$ was produced by the thermal neutron capture $Na^{23}(n,\gamma)Na^{24}$ reaction. By observing the decrease in gamma radiation from the $Na^{24}$ and 2.75 MeV or greater energy levels with time, a measure of the horizontal speed of the liquid was obtained.

Further, co-pending application Ser. No. 808,422 referenced above, discloses a method of compensating for the effect of interfering gamma radiation of the radioactive isotope manganese 56 resulting from neutron irradiation of the steel casing.

However, it has been found that gamma ray activities other than $Na^{24}$ from flowing formation water behind casing and $Mn^{56}$ from the casing are produced during neutron irradiation of the borehole and casing and formation adjacent thereto. Further, it has been found that these other gamma ray activities must be considered as interfering activities and compensation must be made for their presence in order to obtain more accurate, and thus more meaningful, horizontal water flow velocities in formations.

Examples of these other interfering gamma radiation activities typically present in irradiated formations include that of calcium 49 from the activation of calcium within the formation and additional sodium 24 resulting from the activation of interstitial saline formation water or from saline water which is often used to mix the borehole casing cement or saline borehole water. This additional sodium 24 activity is distinguished from the activity due to the horizontal flow of formation fluid in that the radioactive sodium casing the additional activity is not moving with the flowing formation water. It is referred to as "fixed" sodium 24 activity.

SUMMARY OF INVENTION

Briefly, with the present invention, a method is disclosed for determining the flow rate of earth formation fluid moving in a horizontal direction behind casing using a sequential logging technique to improve the accuracy of flow velocity measurement. The earth formations over an interval of depth in the vicinity of the well borehole at a particular depth are initially logged sequentially, that is a number of times, at a fixed logging speed to determine the number of counts for sub-intervals in the depth interval. From these initial sequential logs, a measure of the background gamma radiation of the interval is obtained.

The earth formations in the interval are then irradiated in a sequential number of passes by bombardment with neutrons to neutron activate elements in the formation, formation fluid, casing and borehole. Count rate signals representative of gamma radiation are then detected during a series of sequential counting passes to obtain a cumulative number of counts for each subinterval in the interval under investigation. The time duration of the intervals during which the count rate signals are obtained is also measured.

Based on the detected count rate signals, the measured time intervals, the suspected interfering activities and corresponding half-lives, the flow velocity of the fluid is obtained, as well as a measure of the amount of gamma radiation attributable to the tracer element in the fluid, typically sodium isotope 24, along with a measure of the interfering gamma radiation attributable to elements in the formation and casing.

Where desired, the number of additional count rate measurements may be increased, together with the number of measured time intervals to obtain a more statistically precise measure. As another feature of the present invention, the obtaining of a measure of the amount of gamma radiation attributable to elements in the formation, casing and to the tracer element in the fluid lends itself to an iterative process wherein an initial or test flow speed is assigned and initial measures of the amount of gamma radiation attributable to elements in the formation, casing and to the tracer element in the fluid are obtained. The test flow speed is then adjusted based on the results of the initial measures obtained, and subsequent measures of the presence of the elements in the formation, casing and tracer elements in the fluid repeated until a statistically acceptable fluid flow velocity is obtained.

Accordingly, with the present invention, the lateral movement of fluids in a well borehole is accurately obtained and determined by neutron activation of the element sodium present in salt water as a portion of the fluids present in the formations adjacent the borehole. Furthermore, the effect of interfering activities of elements in the formation and the casing is taken into account and compensation for the otherwise interfering effect of neutron induced gamma radiation of these elements effected. Thus, according to the present invention, a more statistically accurate and precise measure of lateral movement and horizontal flow speed of formation fluid in the vicinity of a well borehole is obtained.

Other objects, features and advantages of the present invention will become apparent to those skilled in the art when considering the following detailed description of the invention.

DESCRIPTION OF THE PREFERRED EMBODIMENT

I. APPARATUS

Figure 1:
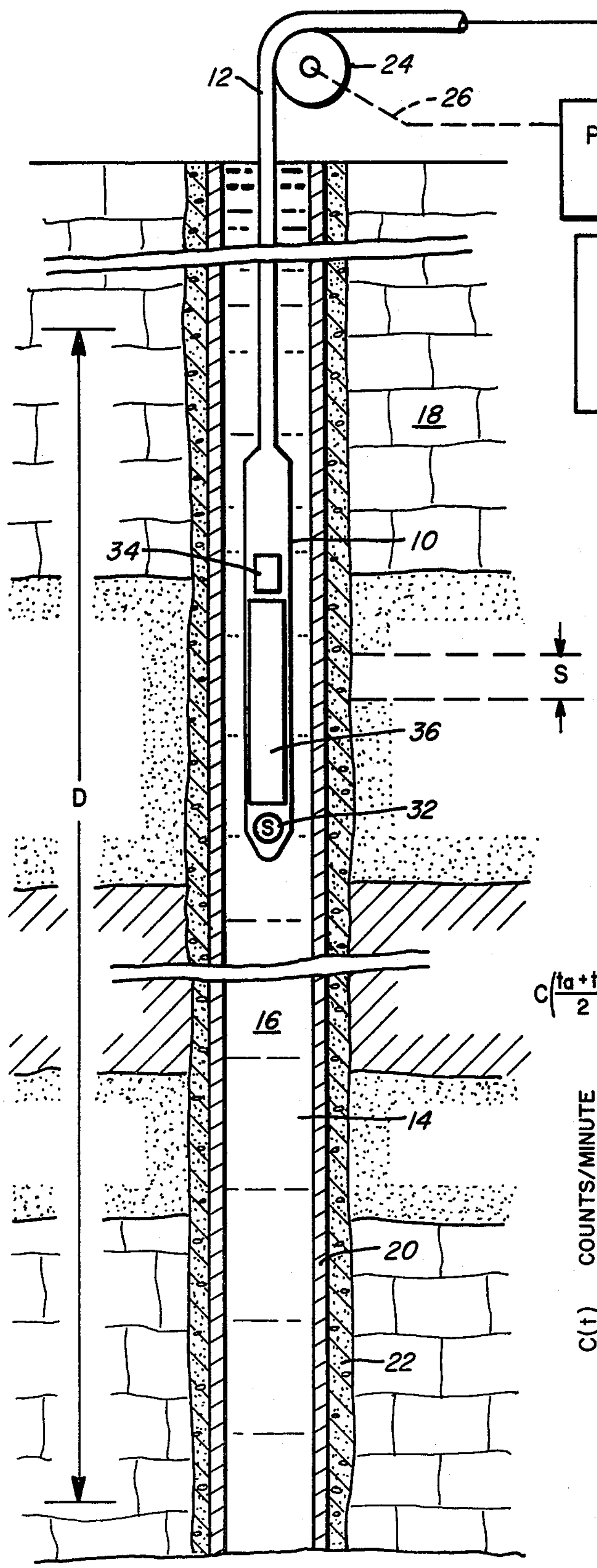
FIG. 1 is an illustration showing schematically a well logging sonde for horizontal water flow detection in accordance with the principles of the present invention.
Figure 1:
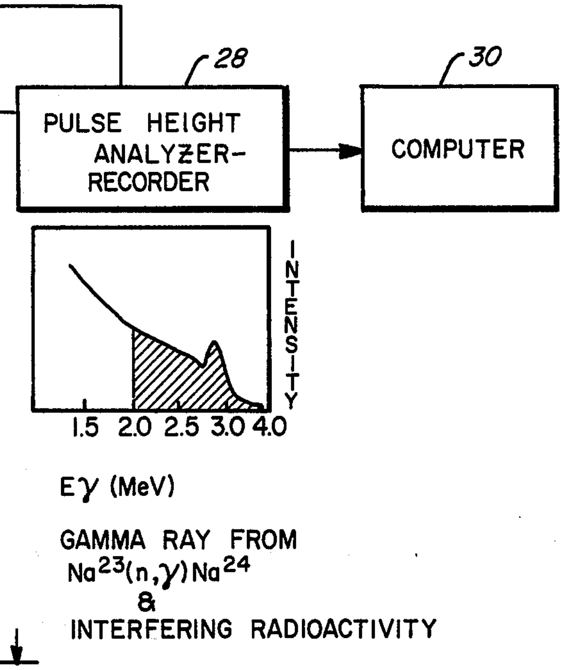

Referring now to FIG. 1, a horizontal flow measuring system in accordance with the present invention is shown schematically. A downhole sonde 10 is shown suspended by a well logging cable 12 in a well borehole 14 which is filled with borehole fluid 16 and surrounded by earth formations 18. As is typical, a steel alloy casing 20 and cement lining 22 are interposed between the formation 18 and the sonde 10. The casing 20 is usually alloy steel, containing manganese as one of the component elements.

The well logging cable 12 passes over a sheave wheel 24 which is mechanically or electrically coupled, as indicated by the dotted line 26, to a pulse-height analyzer/recorder 28 so that measurements from the downhole sonde 10 may be recorded as a function of depths in a well borehole 14. A digital computer 30, such as a PDP-11 computer, receives output signals from the pulse height analyzer 28, for reasons to be set forth.

Housed in the downhole sonde 10 is, at its lower end, a neutron source 32 which may be a continuous chemical neutron source such as Actinium Berrylium source, an Americium Beryllium source or a Californium 252 source as may be desired. For best results, the neutron source should have an intensity as close as possible to $10^8$ neutrons per second.

Spaced about five feet from the neutron source is a single gamma ray scintillation detector 34. The detector 34 comprises a sodium iodide thalium activated crystal or a cesium iodide thallium activated crystal approximately 2 inches by 4 inches in extent and cylindrical in shape. The scintillation crystal of detector 34 is optically coupled through a photomultiplier tube (not shown) which functions to count scintillations or light flashes, occurring in the crystal from impingement thereon by high energy gamma rays from radioactive materials in the vicinity.

As is known in the art, the pulse height of voltage pulses produced by the photomultiplier of detector 34 are proportional to the energy of the gamma rays impinging upon the crystal of the detector 34. Thus, a succession of pulses from the detector whose pulse height is proportional to the energy of the impinging gamma rays is produced and is coupled to the surface pulse height analyzer 28 via a conductor of the well logging cable 12. Appropriate power sources (not shown) are supplied at the surface and connected to the downhole electronic equipment via conductors of cable 12 in order to supply operational power for the downhole detector 34 in a manner conventional in the art.

The space between the neutron source 32 and the detector 34 in the downhole sonde 10 is shielded by a shielding material 36 of suitable type to prevent direct irradiation of the detector crystal with neutrons from the neutron source 32. Shielding materials with high hydrogen content such as paraffin or other polymolecular hydrocarbon structure may be utilized for this purpose. The high hydrogen content serves to slow down or rapidly attenuate the neutron population from the neutron source and prevent this thermalized neutron population from reaching the vicinity of the detector crystal. To this end, strong thermal neturon absorbers such as cadmium may be interposed in layers with the hydrogenate shielding material in order to make up the shield portion 36.

In logging operations, the sonde 10 is moved through a subsurface formation interval D of interest at a specified logging speed so that the interval D is partitioned into a number of sub-intervals, one of which is shown as S in FIG. 1. As will be set forth in more detail below, the sonde 10 first makes a plurality of sequential background logging passes through the interval with source 32 removed and the detector 34 active so that a measure of background gamma radiation from the interval D may be obtained. The source 32 is then inserted within the sonde and the detector 34 deenergized and the sonde 10 makes a plurality of sequential irradiation passes through the interval D during which the formation 18, casing 20 and the tracer element in the formation fluid are bombarded with fast neutrons. Thereafer, source 32 is removed and detector 34 again energized, with the sonde 10 then moved through the interval D for a plurality of sequential detecting passes to detect gamma radiation resulting from radioactive decay of those elements in the formation 18, casing 20 and formation fluid which have become neutron activated during the irradiating passes of the sonde 10.

Signals from the downhole detector 33 are transmitted to the surface via the logging cable 12 and are provided as input to the pulse height analyzer/recorder 28. A suitable energy window threshold is set, such as from 2.0 MeV to 3.8 MeV, so that the $Na^{24}$ peak at approximately 2.65 MeV is present in the pulse height analyzer/recorder 28, for reasons to be set forth. The computer 30 receives count rate signals from the pulse height analyzer 28 and processes such signals in a manner to be set forth, to determine the lateral horizontal flow velocity v and also the relative interfering activities of formation elements.

II. PHYSICAL PRINCIPLES INVOLVED

U.S. Patent Application Ser. No. 698,394, now U.S. Pat. No. 4,051,368, referred to hereinabove discloses a technique of measuring v, the linear speed of water moving past a cased well bore at an angle of approximately 90° with respect to the axis of the well bore. The knowledge of v so obtained is very useful in current secondary recovery, future tertiary recovery, and other field operations.

According to this technique, it is possible to "manufacture" radioactive isotopes within certain liquids by irradiating the moving liquid with neutrons. As an example, if the formation water is saline, radioactive $Na^{24}$ can be produced by the thermal neutron capture $Na^{23}(n,\gamma)Na^{24}$ reaction.

Accordingly, a logging sonde containing a neutron source is positioned within the well borehole adjacent a formation containing horizontally moving water. The neutron source irradiates the water producing radioactive $Na^{24}$ which decays by the emission of gamma radiation. When a gamma ray detector is moved to a position previously activated by the neutron source, a decrease in intensity with time of the induced activity is observed. If the liquid is not moving and radioactive $Na^{24}$ is the only source of gamma radiation other than background or natural gamma radiation, the observed decrease in activity with time t, when corrected for background or natural gamma radiation, will follow the exponential decay $e^{-\lambda_{Na} t}$ where $\lambda_{Na}$ is the decay constant of $Na^{24}$. If, however, the liquid is moving in a horizontal direction, the observed decrease in activity will be due to the exponential decay $e^{-\lambda_{Na} t}$ plus an additional decrease caused by the induced activity being swept away from the vicinity of the detector by the moving liquid. The observed decrease in induced activity above the expected exponential decay $e^{-\lambda_{Na} t}$ is thus used to determine the horizontal linear speed of the moving liquid.

In the other co-pending U.S. Patent Application referenced hereinabove, Ser. No. 808,422, filed June 20, 1977, it was found that radioactive isotope $Mn^{56}$, which occurs due to activation in the steel well casing containing manganese, limits the accuracy of measurement of the flow velocity v.

So far as is known, there is no way to adjust energy bias levels of a gamma ray detector and effectively differentiate between $Na^{24}$ and $Mn^{56}$ gamma radiation. As is evident from FIG. 3, the observed counting rates from $Mn^{56}$ are observed even with the energy bias of a gamma ray detector set at 2.65 MeV. Relative contributions from $Mn^{56}$ also increase at lower energy biases. One proposed method of eliminating this $Mn^{56}$ "interference" would be to delay the counting to allow the shorter lived $Mn^{56}$ to decay to a negligible level. In situations where either the linear flow velocity of the fluid is relatively high or the salinity of the water is relatively low, or both, long delays in counting results in loss of the $Na^{24}$ gamma radiation as well as that of $Mn^{56}$, prevent meaningful data concerning fluid flow velocity from being obtained.

With the techniques of this other co-pending application, the counting rate C(t) in counts/minute recorded by the gamma ray detector at time t measured from the termination of irradiation is $$C(t)=K_{Na}e^{-\lambda_{Na}t}f(v[t+g(T)])+K_{Mn}e^{-\lambda_{Mn}t}+B \qquad (1)$$

where $\lambda_{Na}=0.04651\ hrs^{-1}$ = decay constant for $Na^{24}$ $\lambda_{Mn}=0.2707\ hrs^{-1}$ = decay constant for $Mn^{56}$ B = count rate from naturally occurring radioactive elements within the formation $K_{Na}$ = observed gamma ray activity from $Na^{24}$ induced by neutron irradiation and measured at the end of irradiation (t=0) if there were no water movement $K_{Mn}$ = observed gamma ray activity from $Mn^{56}$ induced by neutron irradiation and measured at the end of irradiation.

and further where:

$$f(v[t+g(T)])=1+av[t+g(T)]+b(v[t+g(T)])^2+c(v[t+g(T)])^3+d(v[t+g(T)])^4 \qquad (2)$$

where for a 10 inch borehole with 7 inch casing in a 33% porosity sand formation, $a=-1.43\cdot10^{-2}$ $b=-5.78\cdot10^{-3}$ $c=2.25\cdot10^{-4}$ $d = -4.00 \cdot 10^{-7}$ v=horizontal flow velocity in inches per hour; and $$g(T) = p + qT + rT^2 \tag{3}$$

where p=0 q=0.4553 r=0.01067

T=irradiation time (hours)

Physically, $f(v[t+g(T)])$ is a term which represents the decrease in observed $Na^{24}$ activity due to horizontal water movement after irradiation. G(T) represents a decrease in $Na^{24}$ build-up due to water movement during irradiation. As disclosed in this second application, the velocity v is measured while compensating for the presence of $Mn^{56}$ and its interfering effect with detection of $Na^{24}$ gamma radiation.

According to the present invention, the foregoing radioactivity well logging techniques are improved in a new and improved process for measuring v, the quantity of interest, from C(t), a measured nuclear counting rate. Since the nuclear decay process is statistical in nature, C(t) has an associated statistical uncertainty. The uncertainty in C(t) is eventually reflected as an uncertainty in v. It is advantageous, therefore, to induce as much $Na^{24}$ activity ($K_{Na}$) within the formation water as possible. For a single irradiation pass of the logging sonde 10, $K_{Na}$ can be increased by increasing the neutron source strength. Considering transportation and handling problems, the maximum practical neutron source strength is approximately $10^8$ neutrons/second.

On the other hand, $K_{Na}$ can be increased according to the present invention appreciably by making multiple sequential passes of the logging sonde 10 over the interval D of interest. Defining $L_I$ as the logging speed and $H_{Na}$ as the half life of $Na^{24}$, it is apparent that $K_{Na}$ will build up considerably as a result of sequential irradiation passes if $D/L_I < H_{Na}$. Unfortunately, the interfering radiation from $Mn^{56}$, $K_{Mn}$, also builds up. However, the build up rate of $K_{Mn}$ is less than that of $K_{Na}$ since $H_{Mn} < H_{Na}$.

It can be shown, and verified, from test results obtained using test cell experimental data, that $$K_{Na} = Z_{Na} \frac{(1 - e^{-\lambda NaQ/LI \cdot 60})(e^{-\lambda NaNID/LI \cdot 60} - 1)}{(e^{-\lambda NaD/LI \cdot 60} - 1)} \tag{4}$$

$$K_{Mn} = Z_{Mn} \frac{(1 - e^{-\lambda MnQ/LI \cdot 60})(e^{-\lambda MnNID/LI \cdot 60} - 1)}{(e^{-\lambda MnD/LI \cdot 60} - 1)} \tag{5}$$

where $\lambda_{Na}$, $\lambda_{Mn}$=decay constants of $Na^{24}$ and $Mn^{56}$, respectively ($hrs^{-1}$);

$L_I$=logging speed during irradiation phase (feet/minute);

D=vertical extent of interval being investigated (feet);

$Z_{Mn}$, $Z_{Na}$=constants depending upon reaction cross sections, sonde design, formation porosity, water salinity, and borehole conditions which are obtained from and verified by using test well data; and $N_I$=number of irradiation passes.

Equations (4) and (5) assume (a) the effective vertical extent of irradiation at a given depth, Q, is one foot, and (b) the irradiation passes over the vertical interval D are made sequentially in time (since Q equals one foot, it will be ignored in the remaining Equations). Substituting Equations (4) and (5) into Equation (1) yields $$C(t) = Z_{Na} \frac{(1 - e^{-\lambda Na/LI \cdot 60})(e^{-\lambda NaNID/LI \cdot 60} - 1)}{(e^{-\lambda NaD/LI \cdot 60} - 1)} \cdot f(v[t + g(T)])e^{-\lambda Nat} + Z_{Mn} \frac{(1 - e^{-\lambda Mn/LI \cdot 60})(e^{-\lambda MnNID/LI \cdot 60} - 1)}{(e^{-\lambda MnD/LI \cdot 60} - 1)} e^{-\lambda Mnt} + B \tag{6}$$

At this point, the amount of $Na^{24}$ (and also the amount of $Mn^{56}$) has been increased in the vicinity of the borehole by utilizing the technique of sequential irradiation. In principle, three detecting or counting passes can now be made with the logging sonde 10 at three different times $t_1$, $t_2$, and $t_3$; record the counting rates $C(t_1)$, $C(t_2)$, and $C(t_3)$, obtain three independent equations of the form of Equation (6); and solve, in the manner set forth in co-pending U.S. Patent Application Ser. No. 808,422, these three Equations. Of course, B must be measured previously, in a manner to be set forth.

Solution of these equations yields results for $Z_{Na}$, $Z_{Mn}$, and f(v(t+g[T]). From the resulting value of f(v(t+g(T))), Equation (2) may then be solved to obtain v, the quantity of interest.

However, with the present invention it has been found that the statistical accuracy of v can be improved further by making a series of sequential counting passes following a series of sequential irradiation passes. Once the entire interval D has been activated sequentially, the neutron source 32 is removed or de-activated, and the counting phase of the logging operation begins. Considering now the response of the gamma ray detector 34 within a subinterval of vertical extent S (FIG. 1), a number $N_c$ of sequential counting passes during a time interval $t^a$ to $t^b$ are made. $I(t^a,t^b)$, the cummulative number of counts recorded in the interval S during the time interval $t^a$ to $t^b$ (see FIG. 2), is $$I(t^a,t^b) = \int_{u_1}^{r_1} C(t)dt + \int_{u_2}^{r_2} C(t)dt + \ldots + \int_{u_{N_c}}^{r_{N_c}} C(t)d \tag{7}$$

where $u_j$ and $r_j$ are the times, measured from the end of the irradiation sequence, at which the detector 34 enters and leaves zone S, respectively. The subscripts j indicate the counting pass number. Referring again to C(t) as defined in Equation (6), it can be seen that Equation (7) is a sum of time integrals including fourth-order polynomial functions of time, f(v[t+g(T)]) as defined in Equation (2), which is the function containing the flow velocity v, which is the quantity of interest, as a portion thereof. However, in order to enhance the statistical accuracy of the measurement of $I(t^a,t^b)$, logging passes with the sonde 10 are made sufficiently often that $$t^a - t^b << 0.693/\lambda_{Na} \tag{8}$$

and the time of logging delayed so that, $$K_{Mn}e^{-\lambda Mnt} << K_{Na}e^{-\lambda Nat} f(v[t+g(T)]), \text{ then} \tag{9}$$

$$I(t^a,t^b) = C\left(\frac{t^a + t^b}{2}\right)N_cS/L_c \tag{10}$$

or

Figure 2:
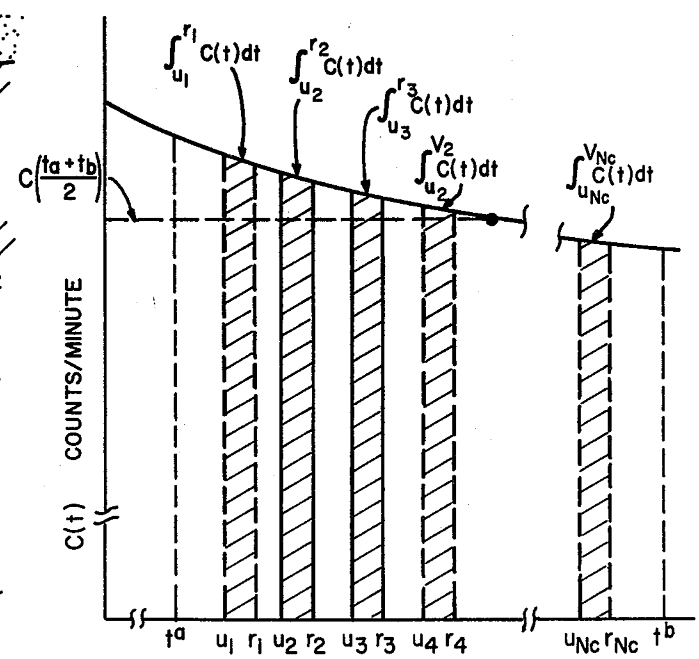
FIG. 2 is a graphical representation illustrating measured gamma radiation counting rates in a borehole as a function of time.

-continued $$C\left(\frac{t^a + t^b}{2}\right) = \frac{I(t^a,t^b)L_c}{N_cS} +/- \left(\frac{L_c}{C\left(\frac{t_a + t_b}{2}\right)N_cS}\right)^{\frac{1}{2}} \tag{11}$$

where $$C\left(\frac{t^a + t^b}{2}\right)$$

is the average count rate recorded during the interval $t^a$ to $t^b$ (FIG. 2). The uncertainty in Equation (11) is the percent standard deviation. The assumptions of Equations (8) and (9) are not necessary conditions for the sequential logging operation but will greatly simplify the discussion of the statistical accuracy of the measurements. Field observations, however, have shown that assumptions of Equations (8) and (9) are usually valid.

III. BACKGROUND GAMMA RADIATION MEASUREMENT

Before initiating the irradiation phase of the logging operation, the background counting rate B is determined. This is accomplished by logging sequentially the entire depth interval D with the neutron source 32 removed or inactive. $N_B$ sequential passes are made at a logging speed $L_B$. $I_B$, the cumulative number of counts from a subinterval S, is recorded. $I_B$ is related to B through the Equation $$I_B = BN_BS/L_B\text{, or} \tag{12}$$

$$B = I_BL_B/N_BS +/- (L_B/BN_BS)^{\frac{1}{2}} \tag{13}$$

where again the uncertainty is the percent standard deviation. Substituting Equations (13) and (11) into Equation (6) yields $$\left(\frac{I(t^a,t^b)L_c}{N_cS}\right) - \left(\frac{I_BL_B}{N_BS}\right) = \tag{14}$$

$$Z_{Na}\frac{(1 - e^{-\lambda Na/LI \cdot 60})(e^{-\lambda NaNID/LI \cdot 60} - 1)}{(e^{-\lambda NaD/LI \cdot 60} - 1)}$$

$$(e^{-\lambda Nat}f(v[t + g(T)]) +$$

$$Z_{Mn}\frac{(1 - e^{-\lambda Mn/LI \cdot 60})(e^{-\lambda MnNID/LI \cdot 60} - 1)}{(e^{-\lambda MnD/LI \cdot 60} - 1)}$$

$$(e^{-\lambda Mnt})$$

The terms on the left hand side of Equation (14) are either measured ($I(t^a,t^b)$, $I_B$) or are known ($L_B$,$L_C$,$N_B$,$N_C$,S) with a percent standard deviation of $$\pm ([L_B/BN_BS] + [L_C/C(\frac{t^a + t^b}{2})N_CS])^{\frac{1}{2}} \tag{14-a}$$

Again, using techniques described in co-pending Patent Application Ser. No. 808,422, three groups of sequential counting passes are made during the time intervals $t^a{}_j$ to $t^b{}_j$ (j=1,2,3), the corresponding values $I(t^a{}_j,t^b{}_j)$ are recorded, three equations of the form (14) are solved for $f(v[t+g(T)])$, $Z_{Mn}$, and $Z_{Na}$, and v is obtained from $f(v[t+g(T)])$. Examining (14−a), it can be seen that the percent standard deviation of the measured quantities is decreased by increasing $N_B$,$N_C$,S and/or decreasing $L_B$ and $L_C$.

IV. EXAMPLE LOGGING OPERATION

Figure 3:
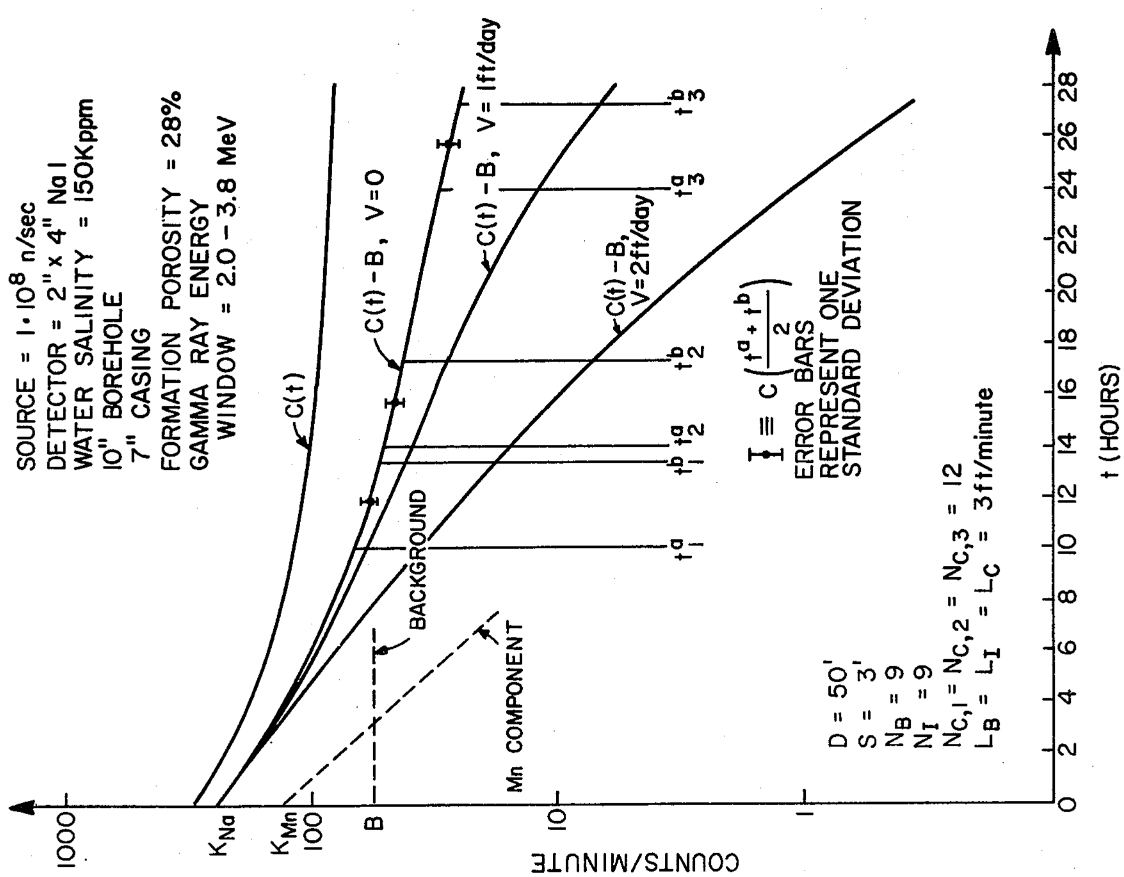
FIG. 3 is a graphical representation illustrating measured gamma radiation counting rates in a borehole as a function of time and of various horizontal fluid flow velocities.

In logging an example interval D (FIG. 1), 50 feet thick, pertinent information concerning the logging sonde 10 is tabulated in FIG. 3. Ten sequential background logging passes are made at 3 feet/minute ($N_B=10$, $L_B=3$). After delays of 12, 14, and 24 hours, the interval D is logged with 12 sequential passes each at three feet per minute $t^a{}_1=12$, $N_{C,1}=12$, $L_{C1}=3$; $t^a{}_2=14$, $N_{C,2}=12$, $L_{c,2}=3$; $t^a{}_3=24$, $N_{C,3}=12$, $L_{C,3}=3$. The counting sequence is shown graphically in FIG. 3. The counts per minute curves are based upon actual field data normalized to the specified irradiation and count sequences. Typical values for the left hand side of Equation (14) along with standard deviations calculated with Equation (14–a) are shown in FIG. 3 for v=0. It is apparent from the error bars that horizontal water flows less than 1 foot/day can be detected with the sequential logging technique of this invention. This technique is thus effective in scanning relatively thick intervals D for horizontal water flows of this magnitude or greater.

V. COMPENSATION FOR FORMATION ELEMENT NEUTRON ACTIVATED GAMMA RADIATION

As disclosed hereinabove, the total gamma radiation intensity $C''(t_i)$ present within the borehole at a time $t_i$ measured from the end of neutron irradiation can be expressed as $$C'(t_i) = K_{Na}e^{-\lambda Nat_i} \cdot f(v \cdot [t_i + g(T)]) + \sum_{j=1}^{n} K_je^{-\lambda jt_i} \tag{15}$$

where

- $K_{Na}$=intensity of moving $Na^{24}$ present at the end of irradiation
- $\lambda_{Na}$=decay constant of $Na^{24}$;
- v=the horizontal flow velocity of the water;
- T=irradiation time;
- $K_j$=intensity of the jth interfering activity at the end of irradiation;
- $\lambda_j$=the decay constant of the jth interfering activity;
- n=the total number of interfering activities; and the functions $f(v \cdot [t_i+g(T)])$ and g(T) are defined in Equations 2 and 3 above, respectively.

If (n+2) counting rates $C(t_i)$ are measured at times $t_i$, (n+2) equations of the form of Equation (15) are obtained. It is possible, therefore, to solve this system of (n+2) equations for the (n+2) unknown quantities of v, $K_{Na}$, and $K_j$ (j=1 to n). In practice, however, the direct solution of the system of equations is extremely complex due to the f function in Equation (2) which is a fourth order polynomial in v. For situations such as this, iteration techniques are preferably used to obtain the desired solution.

Figure 4:
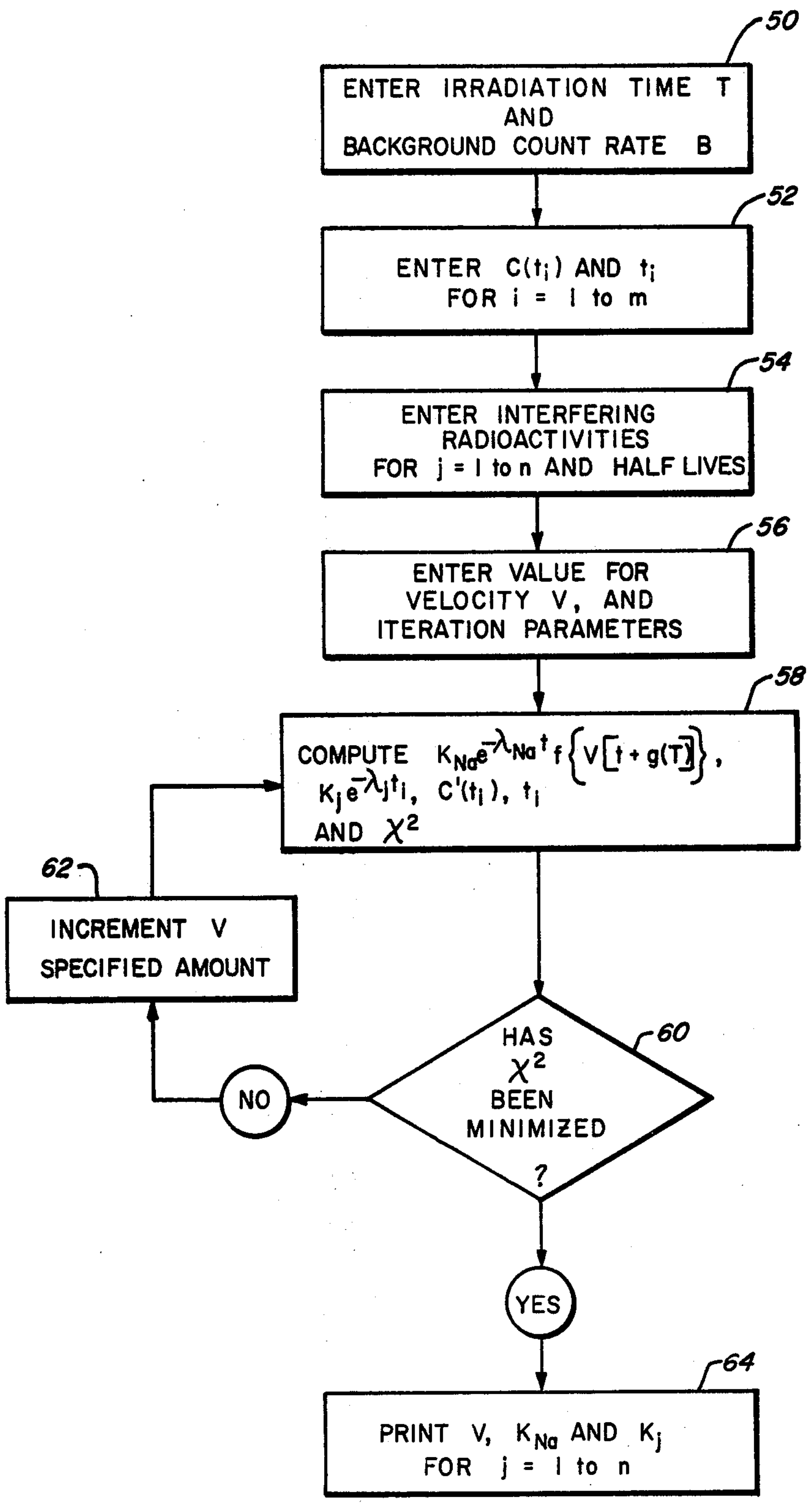
FIG. 4 is a logic flow diagram of process steps suitable for performance in a digital computer according to the present invention.

According to the present invention, therefore, the computer 30 operates according to a sequence of steps (FIG. 4) to obtain accurate flow velocities at the well site. For a given value of v, the unknown quantities $K_{Na}$, $K_j$ (j=1 to n) are determined by least squares fitting the n+1 Equations (15) to the measured counting rates $C(t_i)$. For each iterated value of v, the quantity $$\chi^2 = \sum_{i=1}^{m} \frac{[C'(t_i) - C(t_1)]^2}{C'(t_i)} \quad m \geqq n + 1 \tag{16}$$

is computed where m is the number of measured counting rates. $\chi^2$ approaches a minimum as the iterated value of v approaches the true horizontal flow velocity. The minimization of $\chi^2$ is, therefore, used as the criterion for determining the "goodness of fit" of the iterated velocity v.

The user first enters the irradiation time and background count rate during process step 50. Next, the measured counting rates $C(t_i)$ and the corresponding times $t_i$ are entered into the computer during step 52. The number of suspected interfering activities n and the corresponding half lives are then entered during step 54. Provisions for editing the count data and the interfering reaction parameters may be made, if desired. Finally, an initial assumed value of the velocity v and the velocity iteration parameters of the iteration increments and number of increments to be made are entered during step 56. For each velocity value, the terms $K_{Na}e^{-\lambda_{Na}t}f(v[t_i+g(T)])$; $K_je^{-\lambda_jt_i}$; $C'(t_i)$—computed count rate; and $\chi^2$ are computed and printed during step 58.

A decision instruction 60 determines whether an optimum least squares fit is had between the computed count rate $C'(t_i)$, based on the iteration velocity v, and the measured count rate $C(t_i)$, by determining whether the quantity $\chi^2$ is a minimum for the present iteration velocity v. If not, the velocity v is incremented in the amount specified by the iteration parameters during process step 62 and process step 58 repeated and a new decision step 60 made. These steps are repeated for the iteration cycle. After the iteration cycle is completed, the best fit value of v along with $K_{Na}$ and $K_j$ ($j=1$ to n) are printed during process step 64.

Upon examination of the fit parameters, it is possible to again edit the raw data, vary the iteration value of v, vary the number and half lives of the interfering reactions, or subtract specified amounts of interfering activities in order to improve the fit.

Figure 5:
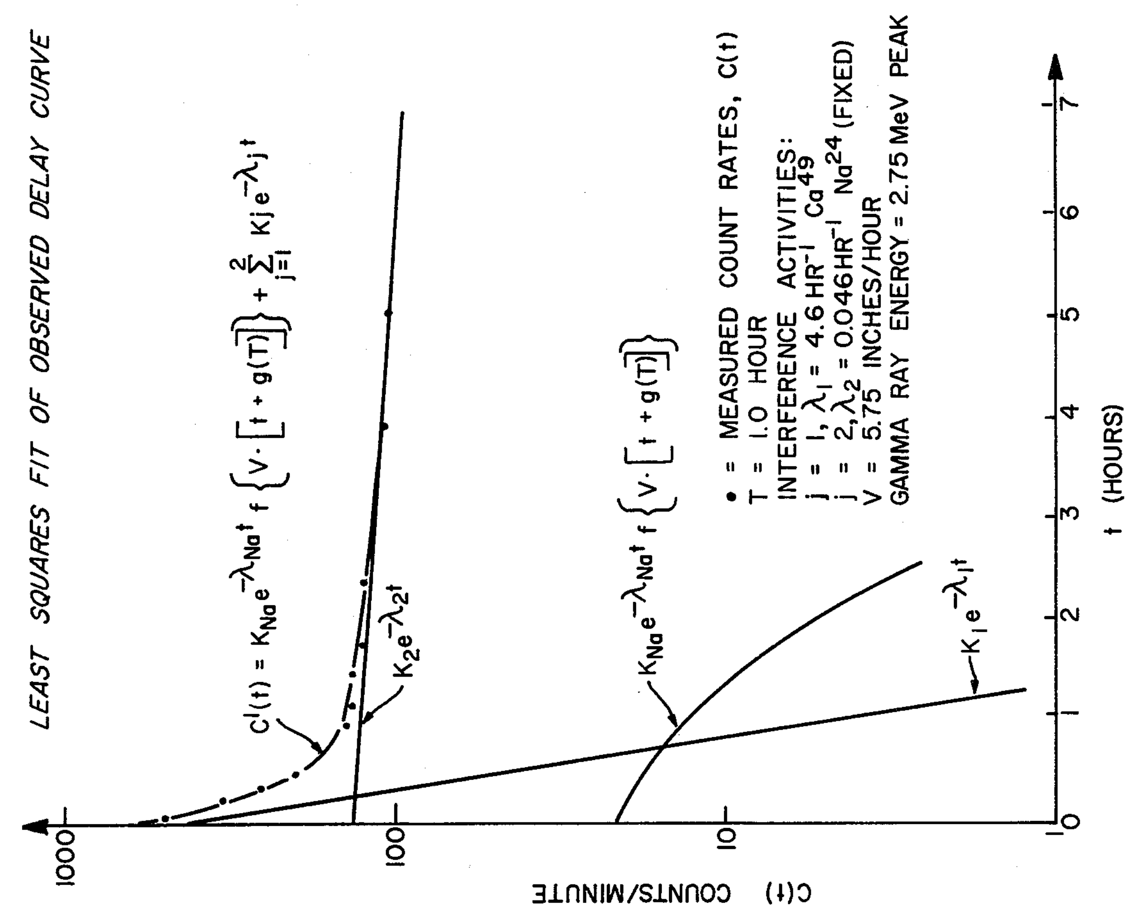
FIG. 5 is a graphical representation of a measure, obtained in accordance with the present invention, of the amount of gamma radiation attributable to elements in a subsurface formation and to trace elements in moving formation fluid.

FIG. 5 is a graphical representation of results obtained with the present invention from field data and processed using the techniques of the present invention. As can be seen, the interfering effect of $Ca^{49}$ and $Na^{24}$ (fixed) have been determined so that compensation can be made therefor.

The foregoing disclosure and description of the invention are illustrative and explanatory thereof, and various changes in the size, shape and materials as well as in the details of the illustrated construction can be made without departing from the spirit of the invention.

We claim:

1. A method for determining the location and flow rate of earth formation fluids moving in a horizontal direction past a casing in a well borehole in a formation interval of interest comprising the steps of:

(a) irradiating the earth formation interval of interest during a plurality of sequential irradiation passes with fast neutrons for a predetermined length of time to neutron activate elements in the formation and casing and at least one selected tracer element in the earth formation fluid moving past the well borehole;

(b) detecting gamma radiation during a plurality of sequential counting passes to obtain count rate signals representative of gamma radiation caused by the radioactive decay of elements in the formation, casing and the selected tracer element in the earth formation interval of interest;

(c) measuring the time intervals during which the count rate signals are obtained during said step of detecting; and (d) obtaining, from the count rate signals and the measured time intervals the flow speed of the fluid, a measure of the amount of gamma radiation attributable to elements in the formation and the casing and a measure of the amount of gamma radiation attributable to the tracer element in the fluid.

2. The method of claim 1, wherein a number n of elements are postulated to contribute gamma radiation to that detected during said step of detecting and wherein:

(a) said step of detecting comprises detecting during n+2 time intervals count rate signals caused by the radioactive decay;

(b) said step of measuring comprises measuring the length of the n+2 time intervals; and (c) said step of obtaining includes obtaining from the n+2 signals and time intervals a measure of the amount of gamma radiation attributable to n elements postulated to contribute gamma radiation.

3. The method of claim 1, further including the step of:

compensating for background radiation naturally present in the casing, formation and fluid.

4. The method of claim 3, wherein said step of compensating includes the step of:

detecting background gamma radiation during a plurality of sequential counting passes to obtain background count rate signals in the earth formation interval of interest.

5. The method of claim 4, wherein said step of compensating further includes the step of:

measuring the time intervals during which the background gamma radiation is detected.

6. The method of claim 5, wherein said step of detecting is performed using a sonde contained detector and further including the step of:

moving the sonde at a controlled rate through the earth formation interval of interest during each of said plurality of sequential counting passes of said step of detecting background gamma radiation.

7. The method of claim 3, wherein said step of compensating is performed prior to said step of irradiating.

8. The method of claim 1, wherein said selected tracer element in the fluid comprises sodium isotope 24.

9. The method of claim 1, wherein said step of obtaining a measure comprises:

(a) initially obtaining a measure of the amount of gamma radiation attributable to elements in the formation and casing and to the tracer element in the fluid based on a test flow speed of the fluid;

(b) adjusting the test flow speed of the fluid based on the results of said step of initially obtaining a measure; and (c) subsequently obtaining a measure of the amount of gamma radiation attributable to elements in the formation and casing and to the tracer element in the fluid based on the adjusted flow speed of the fluid.

10. The method of claim 9, further including the step of:

repeating said steps of adjusting the test flow speed and subsequently obtaining a measure until a statistically acceptable fluid flow speed is obtained.

11. The method of claim 1, wherein the predetermined length of time of said step of irradiating is at least one hour.

12. The method of claim 1, wherein said step of detecting gamma radiation caused by the radioactive decay of elements in the formation, in the casing and said selected tracer element is performed by detecting said gamma radiation in an energy range containing overlapping decay gamma radiation energy levels of each of said selected tracer element, said elements in the casing, and in the casing.

13. The method of claim 1, wherein said step of irradiating is performed using a sonde-contained neutron source and further including the step of:

moving the sonde at a controlled rate through the earth formation interval of interest during each of said plurality of sequential irradiation passes.

14. The method of claim 1, wherein said step of detecting is performed using a sonde-contained detector and further including the step of:

moving the sonde at a controlled rate through the earth formation interval of interest during each of said plurality of sequential counting passes of said step of detecting.

15. The method of claim 1, wherein:

(a) said step of irradiating is performed using a sonde-contained neutron source and further including the step of moving the sonde at a controlled rate through the earth formation interval of interest during each of said plurality of sequential irradiation passes; and (b) said step of detecting is performed using a sonde-contained detector and further including the step of moving the sonde at a controlled rate through the earth formation interval of interest during each of said plurality of sequential counting passes of said step of detecting.

16. The method of claim 1, wherein the formation interval of interest is divided into a plurality of sub-intervals of interest and wherein:

said step of detecting comprises detecting for each of said plurality of sub-intervals gamma radiation during a plurality of sequential counting passes to obtain count rate signals representative of gamma radiation caused by the radioactive decay of elements in the formation, casing and the selected tarce element.

* * * * *